United States Patent [19]

Swarr et al.

[11] Patent Number: 4,652,411
[45] Date of Patent: Mar. 24, 1987

[54] METHOD OF PREPARING THIN POROUS SHEETS OF CERAMIC MATERIAL

[75] Inventors: Thomas E. Swarr, South Windsor; Richard C. Nickols, East Hartford; Myron Krasij, Avon, all of Conn.

[73] Assignee: The United States of America as represented by the United States Department of Energy, Washington, D.C.

[21] Appl. No.: 612,952

[22] Filed: May 23, 1984

[51] Int. Cl.$^4$ ............................................. B29C 67/20
[52] U.S. Cl. ...................................... 264/43; 264/13; 264/63
[58] Field of Search ...................... 264/13, 63, 175, 43, 264/44, 59, 299, 234, 345

[56] References Cited

U.S. PATENT DOCUMENTS

| | | | |
|---|---|---|---|
| 3,993,495 | 1/1976 | Galliath et al. | 264/43 |
| 4,017,347 | 4/1977 | Cleveland | 264/63 |
| 4,046,612 | 9/1977 | Warner et al. | 264/63 |
| 4,151,235 | 4/1979 | May et al. | 264/13 |
| 4,206,270 | 6/1980 | Kunz et al. | 429/40 |
| 4,218,413 | 8/1980 | Stowell et al. | 264/13 |
| 4,226,819 | 10/1980 | Oganesian | 264/43 |
| 4,301,020 | 11/1981 | Johnson et al. | 264/13 |
| 4,353,958 | 10/1982 | Kita et al. | 264/63 |
| 4,369,154 | 1/1983 | Dougherty | 264/63 |
| 4,407,967 | 10/1983 | Luks | 264/43 |

FOREIGN PATENT DOCUMENTS

| | | | |
|---|---|---|---|
| 4216043 | 8/1963 | Japan | 264/43 |
| 42-27047 | 12/1967 | Japan | 264/43 |
| 53-125415 | 11/1978 | Japan | 264/43 |
| 57-22156 | 2/1982 | Japan | 264/43 |
| 57-145063 | 9/1982 | Japan | 264/43 |
| 1226553 | 3/1971 | United Kingdom | 264/43 |

OTHER PUBLICATIONS

DOE/ET/11320-81, pp. 1-13.

Primary Examiner—Jan Silbaugh
Assistant Examiner—Hubert C. Lorin
Attorney, Agent, or Firm—Hugh W. Glenn; Robert J. Fisher; Judson R. Hightower

[57] ABSTRACT

A method of forming thin porous sheets of ceramic material for use as electrodes or other components in a molten carbonate fuel cell is disclosed. The method involves spray drying a slurry of fine ceramic particles in liquid carrier to produce generally spherical agglomerates of high porosity and a rough surface texture. The ceramic particles may include the electrode catalyst and the agglomerates can be calcined to improve mechanical strength. After slurrying with suitable volatile material and binder tape casting is used to form sheets that are sufficiently strong for further processing and handling in the assembly of a high temperature fuel cell.

5 Claims, No Drawings

METHOD OF PREPARING THIN POROUS SHEETS OF CERAMIC MATERIAL

CONTRACTUAL ORIGIN OF THE INVENTION

The U.S. Government has right in this invention pursuant to Contract No DE-AC01-79ET15440 between the U.S. Department of Energy and United Technologies Inc.

BACKGROUND OF THE INVENTION

This invention relates to a process for preparing thin sheets of ceramic material. The method is particularly applicable to the formation of electrodes for use in high temperature fuel cells which require very thin porous sheets of catalytic material.

Lithiated nickel oxide has long been considered for use as a cathode catalyst within fuel cells employing molten carbonate electrolyte. Molten carbonate fuel cell designs require large thin sheets of such material with tight tolerances for flatness and thickness. Attempts to incorporate preoxidized nickel sheets have encountered difficult handling problems due to their frangible structure. Such structures with adequate strength are extremely difficult to fabricate.

Recently, other ceramic materials have come under consideration for use as electrode catalysts within molten carbonate fuel cells. Materials such as strontium titanate, strontium titanate in mixture with nickel and particles of strontium titanate coated with nickel and/or copper have been suggested as anode materials. Cathode materials including various lanthanum oxygenates of perovskite structure, for example, $LaCoO_3$, have been considered.

These ceramic oxides are extremely difficult to fabricate into thin porous sheets that are suitable for use in molten carbonate fuel cells. One other problem associated with the formation of such electrode structures is the requirement for a wide range of pore sizes. A macroporous network is required to distribute the reactant gases throughout the electrode. In addition, a smaller microporous network is needed to provide a large surface area wetted by electrolyte for reaction sites.

Previous attempts to satisfy these stringent requirements for electrode structures have involved techniques ranging from oxidation of metals within the fuel cell to sintering of compacted plaques of oxide material prior to cell assembly. These techniques have generally resulted in articles of poor structural strength or of inadequate porosity or pore size distribution.

Therefore in view of the above, it is an object of the present invention to provide a method of forming a thin porous sheet of ceramic material.

It is a further object to provide an improved method of forming a thin porous electrode for a molten carbonate fuel cell.

It is yet another object to provide a method of forming a thin sheet of electrode material with a fine pore size structure for contacting electrolyte and a structure of larger pore sizes for admitting reactant gas.

It is a further object to provide a tape casting method for forming a sheet of electrode material with minimal separation of particles in the tape casting slip.

SUMMARY OF THE INVENTION

In accordance with the present invention a method is provided for forming a thin porous sheet of ceramic material. A slurry of fine ceramic particles and liquid carrier is provided and spray dried to remove the carrier and form porous agglomerates having a rough surface texture. The agglomerates are calcined at a sufficient temperature to fix the fine ceramic particles while substantially maintaining their porosity. The agglomerates are used in forming a slip and tape cast into a thin strip having a microporosity characterized by the agglomerate particles and a macroporosity characterized by the spacing between agglomerates.

In further aspects of the invention the slurry includes ceramic particles of at least two different oxides capable of reacting together to form a ceramic oxygenate at the spray drying and calcining conditions.

In other aspects the slip for tape casting includes a polymerizable binder, a solvent, the porous agglomerates and a volatile material capable of converting to gas as the binder sets to form a thin porous solid strip.

The present invention also contemplates a method of preparing electrode catalyst material for a molten carbonate fuel cell. A slurry containing particles of electrode catalyst in liquid carrier is spray dried to produce generally spherical agglomerates with a rough surface texture containing the catalyst particles. The agglomerates are calcined to provide porous spiky agglomerate particles. The agglomerates are formed into an elongated adhesive strip of porous catalyst material by tape casting for subsequently fabricating into a fuel cell electrode.

In other aspects, the electrode catalyst material includes material for use in a molten carbonate fuel cell cathode containing oxides of nickel or oxygenates of lanthanum. One lanthanum oxygenate that is advantageously used with the present method is lanthanum cobaltate. In one other aspect of the invention the spray drying is conducted by spraying the slurry into a chamber at about 100° to 500° C. at about 0.1 to 1.0 MPa pressure and subsequently calcining at about 700° to 1100° C. for about 1 to 6 hours to form agglomerates with spiky morphology.

In yet another aspect of the invention, the tape casting step is conducted by slurrying the agglomerates with binder and volatile to form a slip, the slip is spread into a thin layer onto a smooth substrate and dried to evaporate the volatile, set the binder and form a porous strip of electrode catalyst material with interlocking particles to impart enhanced mechanical strength. The tape casting step advantageously is conducted at room temperature, that is at about 20° to 30° C, with a plurality of slip layers tape cast to provide a laminated porous strip of catalyst material with enhanced strength.

DETAILED DESCRIPTION OF THE PREFERRED EMBODIMENT

The method of the present invention is particularly well adapted for the preparation of large thin sheets of catalyst material for use as electrodes in molten carbonate fuel cells. Cathode materials such as nickel oxide with small amounts of additives such as lithium oxide are contemplated. Other cathode materials such as those disclosed in U.S. Pat. No. 4,206,270 to Kunz et al. including perovskite catalyst are also under consideration. Such perovskites include various lanthanum oxygenates, for instance, $LaCoO_3$ and $LaMnO_3$. Nickel particles are often employed as anode material, but in addition various ceramic particles such as $SrTiO_3$ and $LiAlO_2$ are plated with nickel, copper, and alloys of these materials for use as anode catalyst. It is contemplated that electrodes of these various types can advantageously be prepared by the method of this invention. However, it will be apparent that various other products such as filters and filter papers can be prepared from ceramic particles employing the present process.

In one manner of carrying out the present process, a slurry including the finely divided ceramic particles and a liquid carrier is prepared. As will be seen the selection of the particle size is an important consideration in establishing the porosity of the finished product. For molten carbonate fuel cell electrodes, particles of about 0.2 to 2 microns may be selected. The slurry is formed with a liquid carrier that can include both a volatile component and a binder material. Commercially available binders such as those ordinarily used in tape casting processes may be selected, for instance, a cellulose ether, an unsaturated vinyl alcohol or another suitable olefinic material capable of setting to temporarily bind the fine particles into agglomerates. One such binder is available commercially under the trademark "Cladan". A volatile such as acetone may also be included.

A slurry as thus formed is spray dried and the product subsequently calcined to form agglomerate particles of generally spherical shape but with a rough and spiky external texture. The spray drying and calcining conditions are of importance in establishing the desired agglomerate size and morphology. It is of importance that the spray drying step be performed in cooperation with the subsequent calcining to provide agglomerate particles of high porosity that can subsequently be maintained in a slip slurry for tape casting. Agglomerates of excess density and insufficient porosity are susceptible to separating from the slip as has been realized in prior tape casting processes.

One manner of conducting the spray drying step is to entrain the slurry of ceramic particles into a hot gas and discharge the mixture through a spray nozzle into a chamber at about atmospheric pressure. Gases such as air, nitrogen, helium or argon may be selected. The hot gases are provided of sufficient temperature and quantity to vaporize the carrier solvent leaving agglomerates of the fine ceramic particles and binder within the chamber. A chamber of suitable volume and shape to effect the gaseous solid separation can be provided from well known principles. For instance a tangential flow into the spray drying chamber can facilitate solid-gas separation.

The particles formed by spray drying will have a generally spherical shape but with a roughen outer texture. Typically, agglomerate particles of about 10 to 50 microns are formed. In the subsequent calcining step, the binder is driven off and the particles only slightly sintered together within the agglomerates. The resulting rough and spiky morphology is of particular advantage in attributing mechanical strength to the later formed tape cast product.

The calcining conditions are typically as severe or slightly more severe than the anticipated cell operating conditions to enhance the stability of the agglomerate structure within the operating fuel cell. Molten carbonate fuel cells are contemplated to operate within a range of about 500° C. to about 990° C. and accordingly the calcining temperatures should be within this range.

During the spray drying and calcining steps, solid state reactions can occur to complete formation of the desired ceramic product. For example, the original solids can be provided as an oxide of lanthanium and an oxide of cobalt which oxides react to form lanthanium cobaltate during the spray drying and calcining procedures. Various other solid state reactions can occur between oxides of lanthanium and the oxides of various other materials such as manganese, zinc, potassium, zirconium, strontium, and mixtures of these materials. Likewise, oxides of lithium and aluminum can be selected to react and form lithium aluminate within the scope of the present method.

The spiky, generally spherical agglomerate particles can be reslurried with additional binder and volatile material to form a slip for tape casting. Binders and volatiles may be selected from those typically used in tape casting processes or from those selected in forming the agglomerates described above. However, the tape casting slip will ordinarily be of considerably thicker consistency than the slurry used previously in the spray drying step. The thicker consistency permits layering a strip of tape cast material onto a flat smooth substrate for setting of the binder material. Substrates of glass and various polymeric materials such as the fluoropolyers, e.g. polytetrafluoroethylene often sold under the trademark. Teflon, with hard and smooth surfaces are contemplated for use in this step of the process.

The large and porous agglomerate particles suspended within the slip are of considerable advantage over the fine grain dense particles typically used in tape casting products. Applicants agglomerates particles are of sufficiently low density to minimize their separation from a uniform slip consistency. For this purpose the agglomerates are preferably at least 50% porous with at least 50% of the porosity at pore sizes of less then 30 microns. Furthermore, the very dense products ordinarily formed from slips of fine grain particles can be avoided and a strip of porous material suitable as an electrode catalyst can be provided.

Additional volatile material including solid material that decomposes to form gases can be included in the tape casting slip. Such volatiles on decomposing or burning create porosity among the agglomerates as required in the electrode catalyst material.

Strips of cured tape can be trimmed to a suitable size for electrode use and the trimmings comminuted for recycle to the previously described slurrying step. In the final fabrication of the electrode only firmly bonded tape sheets are handled to avoid the disadvantages of previous processes in which frangible ceramic sinters were tailored for assembly into fuel cells as electrodes.

One important advantage of the present invention is the separate control of agglomerate formation and the formation of the final sheet of catalyst material. In forming the agglomerates, a microporosity of high surface area and small pore size can be established. A tape cast sheet of electrode material can be independently formed with suitable open porosity for gas distribution during the fuel cell operation.

No sintering of the tape cast sheets or of the trimmed electrodes are required prior to assembly in position within the fuel cell. Thus these ordinarily highly frangible thin ceramic electrodes can be conveniently shaped for fuel cell use with the binder material present. After assembly in the fuel cell, the binder can be driven off in a special step or in the normal fuel cell operation. The following example is presented merely as one specific illustration of the invention.

EXAMPLE

A solution of Co and La was prepared by dissolving their oxides in dilute HCl solution at 90° C. An excess of oxalic acid was added to this solution to precipitate the oxalate phases. The precipitate was then held between 80° C. and 150° C. to remove residual HCl and then held between 300° C. and 600° C. for 2 hours to 8 hours to decompose the oxalates. The resulting oxide particles of about 1 micron size were then slurried with methyl cellulose as a binder and spray dried by entrainment in air at about 225° C. The resulting spray-dried particles were porous agglomerates of about 75% porosity, about 2.1 microns median pore size and a broad particle size distribution. About 50% of the agglomerates were 10–30 microns size, about 15% were greater than 30 microns size and the balance less than 10 microns size possibly including fractured agglomerates. The agglomerates were calcined at about 950° C. to improve their structural integrity. The agglomerates were then mixed with the organic binder, polyvinyl butanol and the solvent, denatured ethyl alcohol. The resulting slurry was cast into a thin tape onto a fluoropolymer film. Typical tape thicknesses of 0.05 to 0.1 cm were obtained depending on the number of passes. Binder and solvent were removed by thermal processing to provide tapes of about 70–80% porosity with about 80% of the open pores between 0.4 and 45 microns. The small pore size of the agglomerates provides high surface area for electrochemical activity and the larger intraparticle porosity provides passages for the reactant gases.

It is therefore seen from the above that the present invention provides an improved method for forming thin sheets of ceramic material. The material can be handled and shaped as thin flexible sheets while binder is still present to impart strength. The invention is particularly applicable to the formation of electrode catalysts employing various ceramic oxide materials for use in molten carbonate fuel cells. Electrode catalyst with both a fine pore size for providing a high surface area for electrochemical activity and a second but larger pore size for reactant gas distribution can be conveniently formed with the present method. It is also seen that some of the previous problems with tape casting methods including that of solids separation can be minimized.

Although the present invention is described in terms of particular materials and process steps, it will be clear that with appropriate modifications various changes can be made by one skilled in the art within the scope of the following claims.

The embodiments of this invention in which an exclusive property or privilege is claimed are defined as follows:

1. A method of forming a thin porous sheet of ceramic material comprising:
   providing a slurry of fine ceramic particles and liquid carrier including binder material;
   spray drying the slurry to form generally spherical porous agglomerates having a rough surface texture;
   calcining the agglomerates at a sufficient temperature to drive off said binder material and fix the fine ceramic particles in agglomerates of spiky morphology while substantially maintaining the porosity of the particles;
   slurrying the calcined agglomerates with binder and volatile material to form a slip for casting as a tape;
   spreading a thin layer of the slip onto a smooth substrate and
   drying the slip to set the binder and drive off the volatile material to form a porous sheet of ceramic material.

2. The method of claim 1 wherein the ceramic particles in the slurry include at least two different oxides capable of reacting together to form a ceramic oxygenate at the spray drying and the calcining conditions.

3. A method of preparing electrode catalyst material for a molten carbonate fuel cell comprising:
   providing a slurry containing a liquid carrier including a binder material and particles of electrode catalyst a major portion of which are within size fraction 0.2 to 2 microns,
   spray drying said slurry at about 100°–500° C. at about 0.1 to 1.0 MPa pressure to produce generally spherical, porous agglomerates of about 10–50 microns size with a rough surface texture containing the catalyst particles,
   calcining said agglomerates at about 700°–1100° C. for about 1–6 hours to provide porous, spiky agglomerate particles while substantially maintaining the porosity of the particles,
   slurrying said calcined agglomerates with binder and volatile liquid to form a slip,
   spreading a thin layer of the slip onto a smooth substrate, and
   drying said slip to evaporate volatiles and set said binder to form a porous strip of electrode catalysts with interlocking particles for mechanical strength suitable for fabricating into a fuel cell electrode.

4. The method of claim 2 wherein said electrode catalyst material comprises a cathode catalyst, said catalyst selected from the group consisting of oxides of nickel and oxygenates of lanthanum.

5. The method of claim 4 wherein said catalyst material is $LaCoO_3$.

* * * * *